United States Patent
Smith (10) Patent No.: US 7,373,646 B1
(45) Date of Patent: May 13, 2008

(54) METHOD AND APPARATUS FOR SHARING STACK SPACE BETWEEN MULTIPLE PROCESSES IN A NETWORK DEVICE

(75) Inventor: Peter Ashwood Smith, Hull (CA)

(73) Assignee: Nortel Network Limited (CA)

( * ) Notice: Subject to any disclaimer, the term of this patent is extended or adjusted under 35 U.S.C. 154(b) by 1072 days.

(21) Appl. No.: 10/406,841

(22) Filed: Apr. 4, 2003

(51) Int. Cl.
*G06F 9/48* (2006.01)
*G06F 9/50* (2006.01)
*G06F 9/52* (2006.01)
*G06F 9/44* (2006.01)

(52) U.S. Cl. .................. 718/108; 718/104; 718/102

(58) Field of Classification Search ........ 718/100–108, 718/1
See application file for complete search history.

(56) References Cited

U.S. PATENT DOCUMENTS

| | | | | |
|---|---|---|---|---|
| 4,847,751 A * | 7/1989 | Nakade et al. | ............ | 718/107 |
| 5,550,816 A * | 8/1996 | Hardwick et al. | ......... | 370/397 |
| 5,845,062 A * | 12/1998 | Branton et al. | ............ | 714/25 |
| 6,674,756 B1 * | 1/2004 | Rao et al. | ............ | 370/395.21 |
| 7,145,913 B2 * | 12/2006 | Craig et al. | ................. | 370/401 |
| 7,170,862 B1 * | 1/2007 | Mountcastle | ............... | 370/254 |
| 2003/0051048 A1* | 3/2003 | Watson et al. | ............. | 709/238 |
| 2003/0133294 A1* | 7/2003 | Sittner | ........................ | 362/253 |

OTHER PUBLICATIONS

Kounavis, Michael E. et al. "The Genesis Kernel: A Programming System for Spawning Network Architectures." IEEE. March 2001.*
Campbell, A. T. et al. "The Genesis Kernel: A Virutal Network Operating System for Spawning Network Architectures." IEEE. 1999.*
Campbell, Andrew T. et al. "Managing Spawned Virtual Networks." Springer-Verlag Berlin Heidelberg. 1999.*
Van der Merwe, J.E. et al. "Switchlets and Dynamic Virtual ATM Networks." Chapman & Hall. 1996.*

* cited by examiner

*Primary Examiner*—Lewis A. Bullock, Jr.
(74) *Attorney, Agent, or Firm*—Anderson Gorecki & Manaras LLP (57) ABSTRACT

Network processes within a group of network processes are configured to share stack space by controlling when a context switch may be performed between processes in the group. Since a context switch will not be performed between group members during execution of the event loop, the dedicated stack requirements of the process are limited to that required to store state information when the process is idling on a select function. This reduces system stack requirements by allowing a large portion of the stack to be shared by multiple network processes without creating unintended dependencies between the processes. A semaphore may be used to control access to the shared stack space to prevent unintended context switches between group members. If there is more than one group of processes, the operating system may perform context switches between processes in different groups since each group has its own dedicated area of shared stack.

19 Claims, 3 Drawing Sheets

METHOD AND APPARATUS FOR SHARING STACK SPACE BETWEEN MULTIPLE PROCESSES IN A NETWORK DEVICE

BACKGROUND OF THE INVENTION

1. Field of the Invention

The present invention relates to network devices and, more particularly, to a method and apparatus for enabling multiple threads and processes to share a stack on a network device.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or cells, frames, or segments) between the network devices by utilizing one or more communication links. A particular packet may be handled by multiple network devices and cross multiple communication links as it travels between its source and its destination over the network.

A network device, like a computer, has a basic set of instructions collectively referred to as the operating system. This operating system provides a number of features to allow application programs to share the resources of the network device. Applications running on a network device will share access to the CPU. Information associated with the application is stored in three areas of memory: the code space, the data space, and the stack space. The code space includes the instructions that make up the process or thread as loaded into memory by the operating system. The data space is the area of memory set aside for the process or thread for temporary storage during execution. The stack space is the portion of the memory that stores the state of execution of the program in the event that execution is interrupted. As used herein, a "process" does not normally share data with any other process, whereas a "thread" may share data with a set of related threads.

To enable multiple processes/threads to execute simultaneously on a single CPU, the CPU will allocate a certain percentage of the total available CPU time to each of the various competing processes/threads. The job of assigning time to application programs is called scheduling. There are numerous method for scheduling programs, the simplest of which is a round robin approach in which the total CPU time is divided equally among the number of contending applications. Other more elaborate schemes involve the use of priority schemes so that a number, or priority level, is assigned to applications to enable certain applications to obtain increased amounts of CPU time.

The operating system implements the scheduling schema by interrupting an application that is currently running, storing the state of the current application in a dedicated area of the stack, retrieving the state of the next application from a separate area of the stack, and restoring the retrieved state so that the new application can start executing where it last left off. The process of interrupting the current process and restoring the new process will be referred to herein as a context switch.

The stack is used to store program register values at the point of the function call and also to provide temporary storage to these functions. The stack space typically grows as a process or thread recursively calls deeper and deeper into the program. Temporary, incomplete results from one level are kept on hold in the stack while sub-results are computed and returned. In order for the CPU to perform a context switch at an arbitrary point during execution of the process, the operating system must ensure that the state of the interrupted process is able to be preserved at every arbitrary point. This requires the CPU or process to reserve a worst-case stack. In the context of a network device, each process may require from 10 Kbytes to many Mbytes of stack space.

A network device may, at any given point, have dozens or hundreds of processes enabled, each of which is contending for access to the CPU. Since each process will allocate a worst case stack, a system executing thousands of processes/threads may require between several hundred of megabytes and several gigabytes of stack space. Thus, availability of physical memory may start to limit the number of processes/threads that can be run on the network device.

Network devices, such as edge routers and other routers running on the network, are increasingly being required to run more and more processes to provide enhanced services on the network. For example, to increase network security, it is desirable to isolate networks from each other. Complete isolation would ensure complete privacy, but also requires each network to have its own network components such as routers and dedicated lines. As it is economically unfeasible for most users to build an entire network, the concept of virtual routing has been developed. Specifically, instead of providing each network user with a separate network, a virtual router (VR) is provisioned in the network device serving that user. The virtual router, since it does not share data, code or stack space with other virtual routers, is virtually isolated even though the actual physical network device may be used by many other networks and users. A Virtual Private Network (VPN), formed by encapsulating and/or encrypting transmissions passed through the virtual router may be provisioned through the virtual router to provide a private link through an otherwise public network.

As VPNs and virtual routers become more popular, Internet access routers and other edge network devices are being required to be capable of hosting large numbers of virtual routers. Likewise, routers within the network may be required to handle multiple flows, each of which may be handled by a separate virtual router for redundancy reasons or to facilitate setup of virtual channels or other logical constructs through the network. Accordingly, a network device may need to run hundreds or thousands of processes or threads, each of which requires dedicated stack space. As the number of processes increases, the amount of physical memory required to accommodate the stack allocations of these processes may become excessive.

One attempt to address this issue was to use a common process and handle all instances (via events) in the same process. Since events are able to share stack space, the amount of stack space required to implement the events is much lower than the amount required to implement the same number of processes. One problem with this is that, since events share memory space, a virtual router, if instantiated as a set of events within a common process, is not totally isolated from other virtual routers on the network device. Thus, this solution compromises security. Another problem with this proposed solution is that an incorrect memory access in any one of the events may cause the process to terminate, thus terminating all other events as well. This interdependency enables a minor failure to cause the network device to interrupt service to many end users by effectively requiring the re-instantiation of multiple virtual routers and, potentially, the VPNs configured through them.

Another attempt to reduce memory requirements is to construct the applications such that two or more processes can share stack space. While this is possible in certain circumstances, it is difficult to do this because it is necessary to carefully integrate event loops from both applications into a single loop which selects and dispatches the union of all events in the system. This labor intensive exercise, while potentially feasible when a small number of processes are involved, becomes prohibitively complex as the number of processes increases.

SUMMARY OF THE INVENTION

The present invention overcomes these and other drawbacks by enabling the network process to prevent other processes from obtaining access to a shared stack while executing an event loop. By allowing the network process to prevent a context switch to other processes designated to share the same stack, the network process may select a place during execution where it has relatively low stack requirements. Accordingly, although the process may require a large stack during execution of an event loop, upon completion of the event loop the network processes will store state information in only a fraction of this stack space. Thus, a large portion of the stack may be shared by multiple network processes executing on the network device without creating unintended dependencies between the processes.

According to one embodiment of the invention, the network device initially instantiates all processes on the network device. This is accomplished by initializing each process and identifying event sources of interest to that process. After all event sources are identified for the process, the process will be blocked on a select( ) or equivalent function to enable the network device to instantiate other processes.

Once all processes are instantiated, the network device proceeds to the execution phase in which the network device receives and handles events on identified event sources. Upon receipt of an event, the network device wakes up the network process associated with the event source and blocks other network processes designated as sharing stack space with the awake network process to prevent a context switch. The network process executes the event until the network process reaches another select( ) or equivalent function. Upon completion of the event loop, the other processes in the set of processes contending for the same shared stack space may contend for access to the CPU to enable it to handle an event received via another event source.

By preventing a context switch at an arbitrary point during execution of the event loop associated with processing an event, the network device can ensure that the a process sharing stack space with other processes will execute until its stack requirements have been reduced to an acceptable level before performing a context switch to one of the other processes. This reduces the stack requirements associated with the process and enables the process to allocate much less than a worst-case stack. The portion of the stack that is used but not dedicated to the network process may therefore be shared by multiple network processes. Since each network process is fully able to store its state information in its own relatively small area of dedicated stack, sharing the portion of the stack does not create unintended interdependencies. Additionally, where it is desired to merge two network processes and enable data sharing between the network processes, utilization of shared stack space in connection with blocking execution of other applications during execution of a first application enables data to be retained in the shared area of the stack for use by both network processes without creating unintended dependencies between the network processes.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to one embodiment of the invention, groups of network processes running on the network device are configured to share stack space by causing the operating system to block other network processes in a group from executing while one of the group processes is using the shared stack. By preventing a context switch to other processes, the network process may select a place during execution where it has relatively low stack requirements. Accordingly, although the process may require a large stack during execution, such as during execution of an event loop, upon completion of the event loop the network processes will store state information in only a fraction of this stack space. Thus, a large portion of the stack may be shared by multiple network processes executing on the network device without creating unintended dependencies between the processes. This allows the stack requirements of a network device to be reduced to enable many more processes to be instantiated on the network device simultaneously.

The operating system, according to one embodiment of the invention, allows a set of processes or threads to share a common stack by adopting a slightly modified scheduling algorithm that will only allow a context switch to occur between processes in the set when a process/thread is blocked on a select (or equivalent) operating system function. Each process/thread will still require its own stack to maintain state information up to the point where it executes the select, but this is typically in the range of 1000 bytes or so, as compared to the 10+ Mbytes required to allow a context switch at any arbitrary point during execution of the process. Stated differently, by causing the network device to execute an event to completion, the process (event source)

does not need to reserve a worst-case stack since the CPU has been prevented from performing a context switch during execution of the event.

The invention pertains to any programs which are structured around a common event loop for all events in the system, which may apply to many complex programs. Normally the operating system will provide two kinds of system functions to support this model of programming. The first is a way to associate external events with some kind of internal descriptor, such as "opening" an event source and returning a handle. The second is a way to wait for any one of those event sources to produce an event. While waiting for an event, the operating system will execute other processes. In Unix/Linux, these two functions are respectively "open( )" and "select( )" although the invention is not limited to an implementation in Unix/Linux.

In one embodiment, a semaphore is defined for each group of processes that are to share common stack space. When an event is received, the process takes the semaphore and utilizes the shared stack space during execution. Other processes are blocked on the select( ) and are prevented from executing until the first process releases the semaphore. The network device may have a single group of processes with a single defined semaphore allowing access to a single area of shared stack. Alternatively, the network device may have several or many groups of processes, each group having a semaphore allowing accesses to a specific shared area of the stack. Optionally, as described in greater detail below, each group may have two or more areas of shared stack, the access to each of which is controlled by a semaphore. The invention is not limited to the use of a semaphore, but rather extends to any mechanism designed to control multiple parallel activities in a computer system.

The event sources can be any kind of physical or logical device including a network connection. The applications will open all the sources of events before entering a loop in which they ask the operating system to block them until an event occurs on one of the event sources in which they are interested. When the operating system detects an event, the operating system wakes up the process and the select operating system function (or equivalent) will return which event source is ready. Such an event handling mechanism allows the program to effectively handle numerous sources of events without having to poll or ask repeatedly if events are ready.

Figure 1:
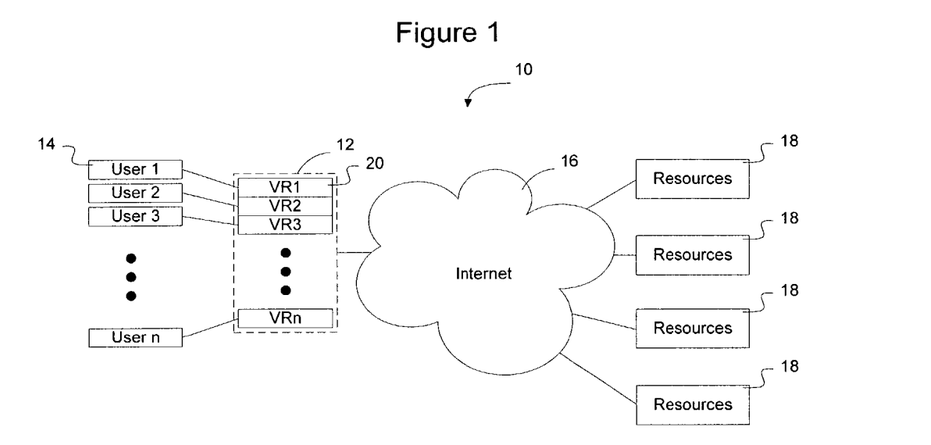
FIGS. 1 and 2 are functional block diagrams of communications networks according to embodiments of the invention.

FIG. 1 illustrates a functional block diagram of an example of a network 10 in which an network device 12 is configured to provide connectivity between users 14 and a network such as the Internet 16. The network device in FIG. 1 is formed as an Internet access router, although the invention is not limited to this particular example. Resources 18 on the network 16 may be accessed via conventional protocols and methods in a known manner.

As illustrated in FIG. 1, the Internet access router 12 may include many virtual routers 20 (VR1-VRn), each of which is configured to support one or more of users 14 (user 1-user n). Each virtual router 20 may be instantiated as a different process on the Internet access router 12 to enable flows intended for the users to be logically separated. This enables increased security as well as improved efficiencies. Although the invention is illustrated as having the same number of virtual routers as users, the invention is not limited in this regard and encompasses any number of virtual routers and any number of users.

Figure 2:
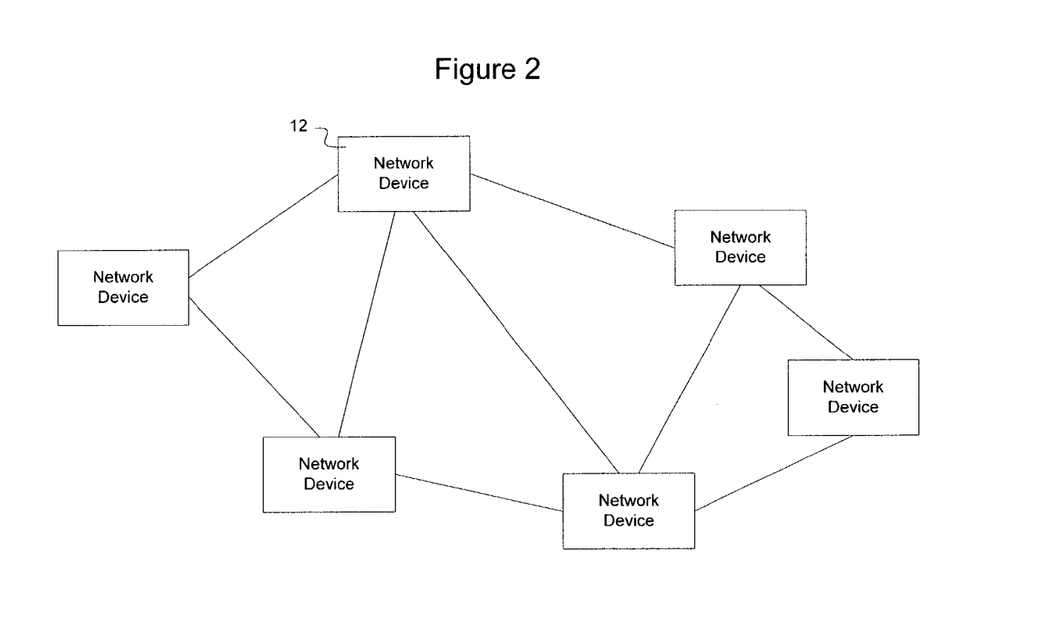

FIG. 2 illustrates a functional block diagram of a network in which network devices 12 are interconnected with each other to provide connectivity across the network. As shown in FIG. 2, each network device 12 is configured to connect with several other network devices to enable traffic originating on one side of the network to be transmitted to network devices on the other side of the network. In operation, each of the network devices may be configured to handle multiple packet flows through the network. In certain circumstances, it may be advantageous to instantiate virtual routers or other logical constructs on each of the network devices to handle traffic passing through the network. Accordingly, each of the network devices 12 may be required to support multiple logical constructs (processes) to facilitate receipt and delivery of packets across the network. Although two networks have been illustrated embodying several different network devices that may require simultaneous instantiation of numerous processes to handle traffic on a network, the invention is not limited to application of the embodiments to these particular network devices but rather extends to all network devices.

Figure 3:
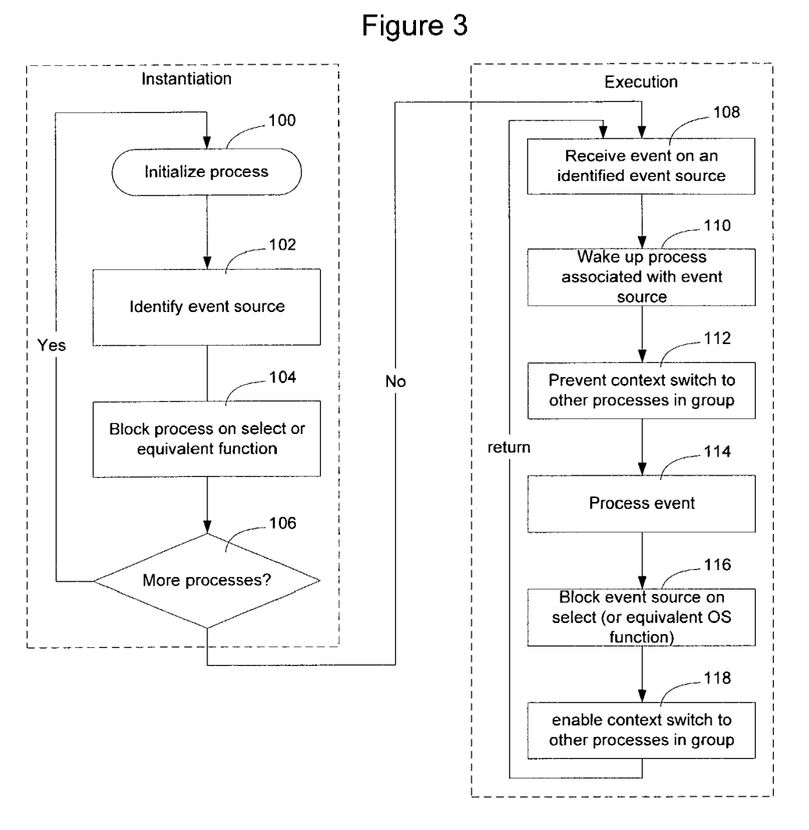
FIG. 3 is a flow chart of an example of software that may be used to implement embodiments of the invention.

FIG. 3 illustrates software configured to implement embodiments of the invention. As illustrated in FIG. 3, for each process to be instantiated on the network device, the network device will initialize the process 100. During the initialization process, the process will be assigned to a group. In this embodiment, processes within a group will share an area of the stack and will be prevented from simultaneous execution. Processes in different groups, by contrast, do not share the same area of stack and thus execution on the CPU may be switched between different groups of processes. Any number of groups may be used. For example, if one group is used, all processes will belong to the same group and use the same area of shared stack. Where two or more groups are used, a portion of the processes will be designated as belonging to each group during initialization.

During execution, as discussed below, the network device may recognize that the groups are not evenly balanced (from a demand perspective) or that overall performance of the network device may be increased by moving processes from one group to another. This may be done by revisiting the group designation and re-designating a process to another group.

During initialization, the network device identifies event sources 102 associated with the process. After identifying all event sources for the process, the operating system blocks the current process on a select or equivalent function 104. It is advantageous to block the network process on a select function, in this context, since the select function may be used to multiplex reads of the event sources without polling during the execution phase (described below). The invention is not limited to utilizing a select function, however, as numerous other functions may be used as well.

In one embodiment, after identifying all event sources and blocking the current process on a select function, the operating system will determine if there are additional processes to be initialized 106. If there are additional processes the operating system will repeat the instantiation process for each of the processes until all processes are opened. In the examples discussed above in connection with FIGS. 1 and 2, each virtual router may be considered a process, and each event source may be a network connection, e.g. link, port, or flow, over which the virtual router may receive packets. The invention is not limited to these particular examples, however.

According to another embodiment of the invention, after instantiating a process, the operating system may enter the execution phase with respect to that process. In this embodiment, as more processes are added, additional processes enter the execution phase. The invention is not limited to these particular embodiments and rather extends to any manner in which the operating system chooses to allocate time between opening new processes and executing existing processes.

Upon entering the execution phase, the operating system waits to receive an event on an identified event source 108. Upon receiving an event, the operating system will wake up the process associated with the event source 110, prevent other processes in the same group from executing 112, and proceed to process the event 114. The other processes in the group may be prevented from executing through the use of a semaphore defined for the shared stack space allocated to that group, as discussed above, or via other known programming constructs. Preventing the other processes in the group from executing enables the group of processes to share stack space, since the operating system will not attempt to perform a context switch to one of the other processes in the group. If there is more than one group, the operating system may perform a context switch to enable other processes in other groups (with other designated stack space) to execute.

Processing of the event continues until the process reaches a select or equivalent operating system function 116 where the process has determined it is acceptable for the operating system to perform a context switch. The process will block on the select( ) or equivalent function and release the semaphore to enable a context switch to occur to other processes within the group so that other events for other processes may be handled.

While handling one event, it may be expected that other events may be received. The operating system may prioritize handling of these events in any number of ways. For example, the operating system may treat all events equally and schedule access to the CPU in a round robin fashion with each process receiving access to handle one or a set number of events before giving another process a chance to handle its allocated number of events. Alternatively, the scheduling algorithm may prioritize certain processes or event sources above other processes or event sources to preferentially allocate CPU time between processes or event sources. The invention is not limited to any particular manner of prioritizing CPU allocation between processes or event sources.

Figure 4:
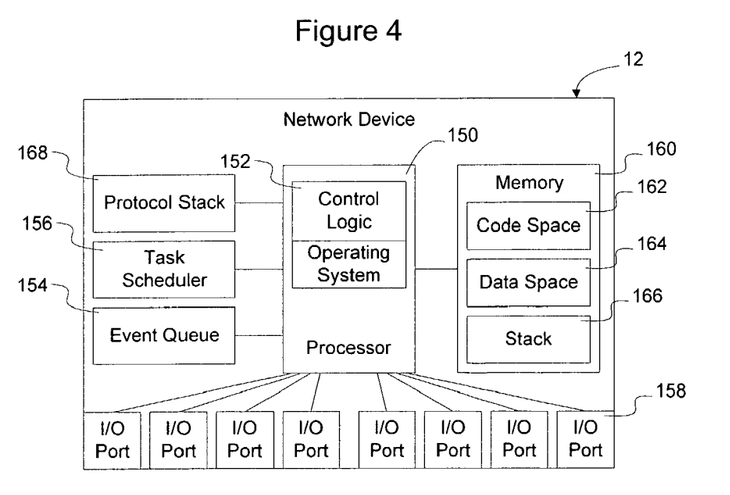
FIG. 4 is a functional block diagram of an example of a network device according to an embodiment of the invention.

FIG. 4 is a functional block diagram of a network device according to an embodiment of the invention. As illustrated in FIG. 4, the network device 12 contains a processor 150 having control logic 152 configured to implement the functions ascribed to it as described above in connection with FIGS. 1-3. Operating system software 154 is instantiated on the processor 150 to enable it to perform scheduling, interrupt, and other functions typical operating system functions. Optionally, a separate task scheduler module 156 may be provided to augment the operating system's internal scheduling abilities to enable processes to receive access to the processor's resources.

The network device includes a plurality of I/O ports 158 to enable the processes running on the processor to receive events. One or more of the I/O ports 160 typically will be identified as event sources for each of the processes during initialization.

A memory 160 is provided to store information associated with the processes executing on the processor 150. In one embodiment, the memory 160 is divided into three areas: code space 162 configured to store instructions associated with the processes; data space 164 configured to store data values associated with the processes; and stack space 166 configured to store state information associated with the processes. In one embodiment, the data and code space is formed as unshared memory, and at least a portion of the stack space is formed as shared memory. In the embodiment illustrated in FIG. 4, the memory 160 is shown as a single memory. The memory 160 may be formed as multiple physical units or as a single physical unit without departing from the scope of the invention.

Interactions with the network 10 may be facilitated through the implementation of a protocol stack 168 containing instructions and data relevant to communications protocols commonly used on those networks. Optionally, the processes running on the network device may include this functionality to obviate the need for a separate protocol stack.

The control logic 152 of FIG. 4 may be implemented as a set of program instructions that are stored in a computer readable memory within the network device and executed on a microprocessor within the network device. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

Pseudo Code Examples

Embodiments of the invention will now be described in connection with several possible pseudo code examples. These examples are illustrative only, and the invention is not limited to implementation of one of these particular examples.

Example Pseudo Code 1:

```
main( )
{ do_system_initializeation( )
    a = open(Event_source_a)
    b = open(Event_sourc_b)
    ......
    while(not finished) {
    event=select(a,b,c,d,.....)
    case event of
       a : handleEventA( )
       b : handleEventB( )
       .....
    }
{
```

As shown in this first example pseudo code, upon initialization, the application opens various event sources until all event sources have been opened. The event source will execute until it reaches a select function, at which point the stack requirements for the event source will still be relatively low. For a typical virtual router, the stack requirements at this point in execution are approximately 1 Kbyte. One commercially available virtual router is the Passport/Neptune virtual router available from Nortel Networks. The invention is not limited to this particular virtual router as any virtual router code may be utilized in connection with the invention.

Upon reaching the select function, the operating system will perform a context switch and begin to open another event source in another process/thread. Once all event sources are opened the operating system will wait for events. Upon occurrence of an event, the operating system will handle the event to completion and not perform a context switch while handling the event. Since handling an event requires executing an event loop, the event source will eventually return to a select, wherein the stack requirements are the same as they were initially (approximately 1 Kbyte). Accordingly, multiple processes/threads can share a common stack since the processes/threads will not require concurrent use of the stack to save state information during a context switch. However, each process is able to have its own separate address space so that a problem with one network process will not cause other network processes to terminate.

One possible way to prevent the operating system from performing a context switch while handling an event is to use a semaphore. Specifically, according to one embodiment of the invention, upon receiving an event and waking up a network process to handle the event, the network process takes the semaphore, and does not release the semaphore until it has finished processing associated with the event.

The event sources can be any kind of physical or logical device including a network connection. For example, an event source may be a port connected to a link, and receipt of a packet at the port may constitute an event. The event source may be a physical connection on the network or a logical connection (VPN) on the network. A process/thread, upon being instantiated on the network device, will open all event sources from which it is interested in receiving events. In a virtual router example, the virtual router would open event sources for each physical or logical network connection. Upon receipt of a packet over one of the network connections, the operating system will wake up the virtual router to process the event and then cause the virtual router to go back to sleep.

Example Pseudo Code 2:

```
main( )
{ do_system initializeation( )
    a = open(Event_source_a)
    b=open(Event_sourc_b)
    ......
    while(not finished) {
    event=select(a,b,c,d,......)
    share_stack_on( );
    case event of
        a : handleEventA( )
        b : handleEventB( )
        .....
    share_stack_off( );
    }
}
```

In this second example pseudo code, an explicit function is used to mark the beginning/end of the execution during which the stack is shared among all of the members. This is more general than using the system select (or equivalent) operating system function but the behavior is similar.

Example Pseudo Code 3:

```
main( )
{ do_system_initializeation( )
    a = open(Event_source_a)
    b = open(Event_sourc_b)
    ......
    while(not finished) {
    event=select(a,b,c,d,......)
    share_stack {
    case event of
        a : handleEventA( )
        b : handleEventB( )
        .....
    }
    }
}
```

In this third example pseudo code, two stack frames are used and a compiler language construct is used to trigger the entry/exit from a shared stack domain. Inside the shared stack domain, the compiler will generate code to reference the appropriate stack based on the context in which a particular variable or parameter was created. Without such language support the programmer would have to adhere to a number of rules to ensure there were no references to the primary stack from within execution in the shared stack domain.

Merging Two Processes

In addition to reducing stack requirements associated with processes running on a network device, embodiments of the invention can be used to merge two or more processes into a single process without having to worry about mutual exclusion issues on the shared memory.

For example, in some instances, two processes are required to be collapsed, for example where there is considerable sharing of information between the two processes and the overhead of message passing is too high. In this instance, a designer may choose to integrate the two processes into a pair of threads and use shared memory to communicate. Unfortunately, such an approach requires that careful attention be paid to mutual exclusion issues with the shared memory. Multi thread access to a shared memory is a difficult form of programming and is error prone if not done carefully.

According to an embodiment of the invention, if a thread cannot be switched out of context unless it is outside a shared stack area, then all memory accesses within the share stack area are safe. Therefore, two processes A and B, can be merged into a single process of two threads A' and B'. Each can have its own event loop with a select (or equivalent) blocking/selection mechanism. Event handling of both systems will then be completely independent in time and each will be run to completion before the next thread has a chance to be scheduled. Utilizing a shared stack approach enables two processes to be modeled as dual threads without encountering complicated shared memory issues.

In the embodiments of the invention described above, a network device has been described as having a single shared stack area that is shared by all network processes in a group. According to another embodiment of the invention, a plurality of shared stack areas are provided for each group of processes. In this embodiment, upon receipt of an event, a process may cause a context switch if there is a shared stack space that is not currently in use by another process.

For example, assume that there are 20 processes in a group, that a network device 12 has room in the stack to hold state values of all 20 processes while blocked on selects, and also has room for 5 of the 20 processes to allocate worst-case stacks. In this instance, the network device could allow up to 5 of the processes in the group to partially execute event loops simultaneously and to perform context switches between these five processes. While performing the event loop, the process is provided with its own dedicated stack space and a temporary dedicated stack space in which to store state information. Upon completion of an event loop, the network process no longer needs the temporarily allocated stack space because the dedicated stack space is sufficient to store state information associated with the network process while the process is blocked on a select. Accordingly, upon completion of the event loop the network process unlocks its portion of the shared stack for use by another process.

Figure 5:
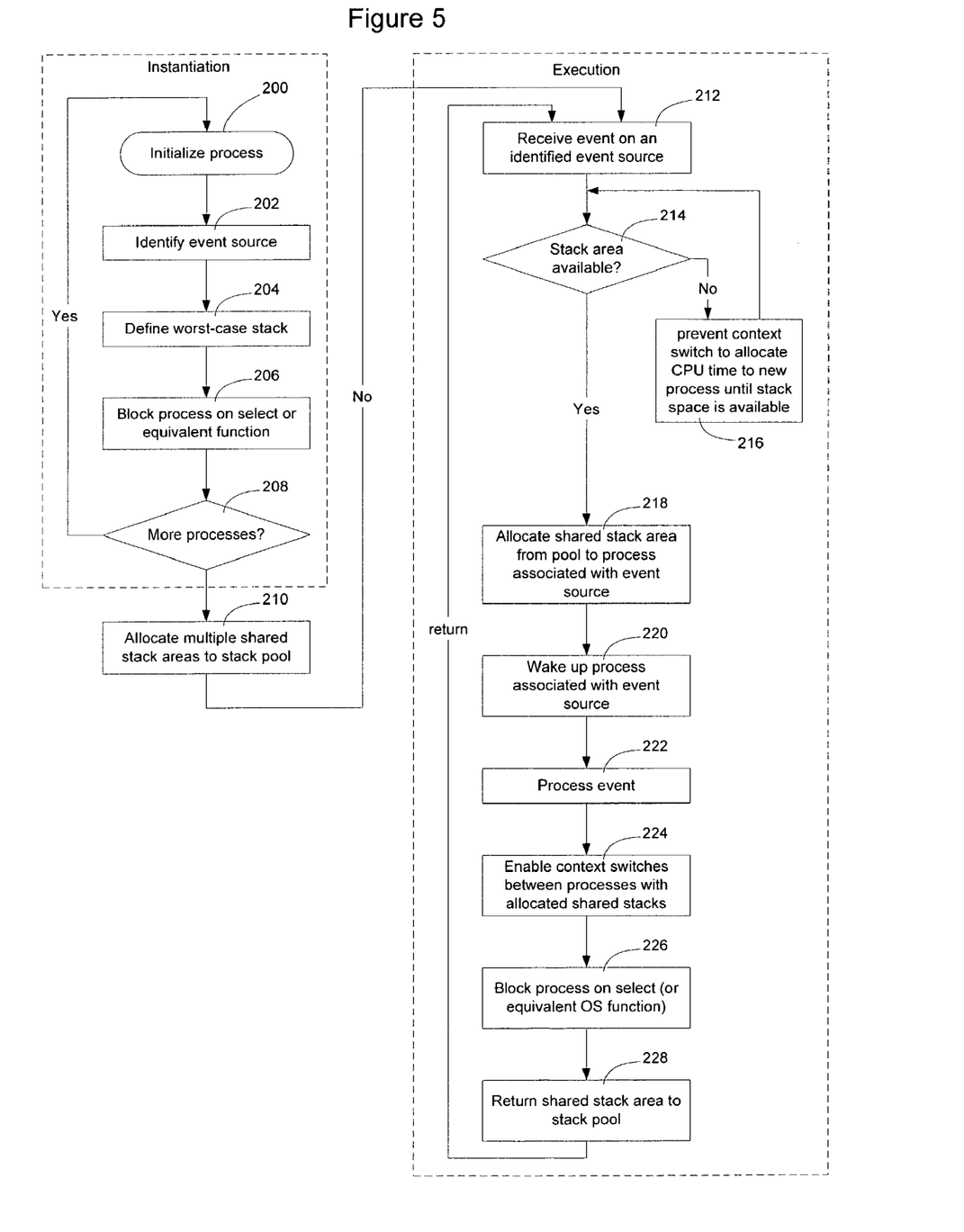
FIG. 5 is a flow chart of another example of software that may be used to implement embodiments of the invention.

FIG. 5 illustrates software configured to implement an embodiment of the invention in which sufficient shared stack space exists to enable several processes from a group of processes to execute simultaneously.

As shown in FIG. 5, the software of this embodiment, like the last embodiment, has two phases: instantiation and execution. In this embodiment, however, the software will need to ascertain the stack requirements of the processes to ensure that sufficient stack space is allocated to enable it to perform a context switch between a subset of the total number of opened processes.

Accordingly, in this embodiment, during the instantiation phase, the operating system will initialize each process 200 and identify event sources 202 associated with that process. The operating system will also define a worst-case stack for the process 204, which may be done by polling the stack requirements of the process or making assumptions about stack requirements given the nature of the process. When the process being initialized reaches a select function, the operating system will block the process on the select or equivalent function 206 and load any other processes that are waiting to be instantiated 208.

After instantiating all processes or, as described above, after instantiating at least one process, the operating system will assess its stack resources in view of the instantiated processes' stack requirements, and allocate one or more areas of shared stack to a stack pool 210. Allocation of the available stack may be performed in a number of ways. For example, the operating system may ascertain the worst-case stack requirements for each of the processes, select the process with the largest stack requirements, and allocate blocks of available stack equal to or larger than the largest stack requirement. In this manner, the operating system is able to allocate uniform addressable blocks of stack to be used by processes, and each process is guaranteed of having sufficient stack space should a context switch occur while it is executing.

In this example, assume that there are 20 processes in the group, that 1 of the processes requires 5 Mbytes of stack space and the other 19 processes each require 2 Mbytes of stack space. The operating system will divide the total available stack space in to sections, each of which has 5 Mbytes of storage capacity. Accordingly, if the total available shared stack space is 11 Mbytes, the operating system will define a stack pool containing two 5 Mbytes areas.

In another embodiment, the operating system may allocate all available stack space to the stack pool and associate unique stack space requirements with each process. The areas of the stack pool in this embodiment are dynamically adjustable depending on which processes are executing event loops on the network device at the time. This option has the advantage of potentially utilizing memory more efficiently and potentially allowing a larger number of processes to execute event loops simultaneously.

Continuing the example from above, assume that the total available shared stack space is 11 Mbytes of storage capacity. Instead of dividing the shared stack space into two areas and only allowing two processes to execute simultaneously, up to five processes (each requiring 2 Mbytes of stack space) may execute simultaneously in this embodiment. One disadvantage of this embodiment is that a process with proportionately higher stack requirements is at a competitive disadvantage since processes with lower stack requirements may more easily find space available on the stack. The invention is not limited to any particular embodiment but rather extends to all possible variations.

Once all processes have been loaded and the operating system has configured itself to handle the multiple processes, the operating system will enter the execution phase. During execution, the operating system will poll event sources identified by the applications until it receives an event on an identified event source 212. Upon receiving an event, the software will check to see if stack area is available 214. Depending on the scheme being used to define the stack pool, this may require ascertaining how many predefined stack areas are being used or whether there is sufficient free shared stack available to handle the anticipated stack requirements of the new process, given the stated stack requirements of the processes currently executing event loops.

If there is insufficient stack space to handle the new event, the process is prevented from executing the event loop until stack space is released by other processes in the group. If there is shared stack space available in the stack pool, or when shared stack space becomes available, the software allocates shared stack space from the stack pool to the process associated with the event source 218. The software then wakes up the process associated with the event source 220 and processes the event 222.

In this embodiment, because there is sufficient stack space to store state information associated with a subset of the total number of processes in the group, the operating system is allowed to perform context switches between those processes that have been allocated stack space from the shared stack space pool 224. This embodiment enhances the CPUs scheduling flexibility while retaining relatively low overall stack requirements for the network device.

Upon completion of execution of an event loop, the software will block the executing process on a select( ) or equivalent function 226, return allocated shared stack space back to the event pool 228, and perform a context switch to allow execution of additional processes using the newly available shared stack space.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of sharing stack space between multiple processes in a network device, comprising the steps of:
opening a plurality of processes on the network device;
providing one of said plurality of processes with access to a computational resource on the network device; and
enabling said one of said plurality of processes to control the network device's ability to perform a context switch while provided with access to said computational resource;
wherein the network device is a router, and the processes are virtual routers.

2. The method of claim 1, wherein the step of enabling comprises taking, by said one of said processes, a semaphore associated with an area of shared stack.

3. The method of claim 1, wherein the step of opening comprises the steps of: initializing the processes and identifying, for each said process, at least one event source.

4. The method of claim 3, wherein the step of initializing the process comprises blocking the process on a select or equivalent function.

5. The method of claim 4, wherein the step of providing includes waking up the process upon receipt of an event on an event source and causing said one of said plurality of processes to execute an event loop.

6. The method of claim 1, wherein the step of opening comprises assigning each of said plurality of processes to a group of processes.

7. A method of enabling a network device to share stack space between virtual routers, comprising:
defining a plurality of virtual router groups;
assigning virtual routers to the virtual router groups;
assigning shared stack space to the virtual router groups; and
preventing context switches between virtual routers in the same virtual router group if there is insufficient assigned shared stack space for that virtual router group.

8. The method of claim 7, wherein the steps of assigning shared stack space and preventing context switches comprises:
for at least a first virtual router group:
defining a first region of shared stack space for said first virtual router group;
allowing a first virtual router in the first virtual router group access to the first region of shared stack space; and
while allowing the first virtual router access to the first region of shared stack space, preventing other routers in the first virtual router group from accessing the first region of shared stack space.

9. The method of claim 8, further comprising the steps of:
for at least the first virtual router group:
defining at least a second region of shared stack space for said first virtual router group;
allowing a second virtual router in the first virtual router group access to the second region of shared stack space; and
while allowing the second virtual router access to the second region of shard stack space, preventing other routers in the first virtual router group from accessing the second region of shared stack space.

10. The method of claim 9, wherein access to the second region of shared stack space is controlled by a second semaphore.

11. The method of claim 8 wherein access to the first region of shared stack space is controlled by a first semaphore.

12. The method of claim 7, further comprising identifying event sources associated with the virtual routers.

13. The method of claim 12, further comprising:
enabling a virtual router upon occurrence of an event on an identified event source if there is sufficient shared stack space to accommodate anticipated stack needs of the virtual router in the event of a context switch; and
not enabling a virtual router upon occurrence of an event on an identified event source if there is insufficient stack space to accommodate the anticipated stack needs of the virtual router in the event of the context switch.

14. A network device, comprising:
a computational resource;
a plurality of processes contending for access to said computational resource;
a memory; and
control logic configured to:
provide one of said plurality of processes with access to the computational resource on the network device; and
enable said one of said plurality of processes to control the network device's ability to perform a context switch while provided with access to said computational resource;
wherein the network device is a router, and the processes are virtual routers.

15. The network device of claim 14, wherein the control logic is configured to enable the processes to control the network device's ability to perform a context switch by allowing said one of said processes to access a semaphore associated with the computational resource.

16. The network device of claim 14, wherein the control logic is configured to open processes by initializing the processes and identifying, for each said process, at least one event source.

17. The network device of claim 16, wherein initializing the process comprises blocking the process on a select or equivalent function.

18. The network device of claim 17, wherein the control logic is configured to provide access to the computational resource by waking up the process upon receipt of an event on an event source and causing said one of said plurality of processes to execute an event loop.

19. A tangible computer readable medium having embodied therein a computer program for enabling stack space to be shared between multiple virtual router processes running on a router, the computer program comprising logic configured to:
open the plurality of virtual router processes on the router;
provide one of said plurality of virtual router processes with access to a shared stack area on the router; and
enable said one of said plurality of virtual router processes to control the router's ability to perform a context switch while the one of the plurality of virtual router processes is provided with access to said shared stack area.

* * * * *